(12) United States Patent
Yoshida (10) Patent No.: US 7,986,477 B2
(45) Date of Patent: Jul. 26, 2011

(54) DRIVING DEVICE AND OPTICAL APPARATUS

(75) Inventor: Hideo Yoshida, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 220 days.

(21) Appl. No.: 12/493,654

(22) Filed: Jun. 29, 2009

(65) Prior Publication Data

US 2010/0046100 A1 Feb. 25, 2010

(30) Foreign Application Priority Data

Aug. 19, 2008 (JP) ................................ P2008-210752

(51) Int. Cl.
*G02B 7/02* (2006.01)
(52) U.S. Cl. ........................................ 359/824; 310/328
(58) Field of Classification Search .................. 359/824; 310/317, 323.01, 320, 328
See application file for complete search history.

(56) References Cited

U.S. PATENT DOCUMENTS

| 5,917,267 A | 6/1999 | Miyazawa et al. |
| 6,483,226 B1 * | 11/2002 | Okada ........................... 310/328 |
| 2006/0082253 A1 | 4/2006 | Hara |

FOREIGN PATENT DOCUMENTS

| JP | 9-191676 A | 7/1997 |
| JP | 11-155292 A | 6/1999 |
| JP | 11-318091 A | 11/1999 |
| JP | 2006-11563 A | 4/2006 |

* cited by examiner

*Primary Examiner* — Joseph Martinez
(74) *Attorney, Agent, or Firm* — Birch, Stewart, Kolasch & Birch, LLP (57) ABSTRACT

A driving device is provided and includes: an actuator that includes a driving shaft attached to a piezoelectric element; and a driving signal control unit. The piezoelectric element is expanded and contracted in response to a driving signal. The driving shaft is reciprocated by the expansion and contraction operation of the piezoelectric element to move a driven member that is frictionally engaged with the driving shaft. The driving signal control unit outputs to the piezoelectric element a second driving signal that increases a driving force applied to the driven member and reduces the movement speed of the driven member during a period from the start of the expansion and contraction operation of the piezoelectric element to a predetermined time, as compared to a first driving signal output when the driven member is moved after the period has elapsed.

6 Claims, 11 Drawing Sheets

DRIVING DEVICE AND OPTICAL APPARATUS

CROSS-REFERENCE TO RELATED APPLICATIONS

This application is based upon and claims the benefit of priority from the Japanese Patent Application No. 2008-210752 filed on Aug. 19, 2008; the entire contents of which are incorporated herein by reference.

BACKGROUND OF THE INVENTION

1. Field of the Invention

The present invention relates to a driving device that drives a driven member and an optical apparatus including the driving device.

2. Description of the Related Art

A driving device and an optical apparatus have been known which include an actuator (piezoelectric actuator) having a driving shaft attached to a piezoelectric element. For example, JP-A-9-191676, JP-A-11-155292, JP-A-2006-115631, and JP-A-11-318091 disclose driving devices in which a piezoelectric element is expanded and contracted by driving signals and a driving shaft is reciprocated by the expansion and contraction operation of the piezoelectric element to move a driven member that is frictionally engaged with the driving shaft.

The driving device disclosed in JP-A-9-191676 controls the time when a voltage is applied to the piezoelectric element to control the movement speed of the driven member, when driving starts, when driving stops, and when a driving direction is reversed. In the driving device disclosed in JP-A-11-155292, driving waveforms are stored in a memory in advance, one of the stored driving waveforms is selected according to a target driving direction and a target driving speed of the driven member, and a driving speed is controlled by the selected driving waveform. In the driving device disclosed in JP-A-2006-115631, if the movement speed of the driven member is less than a predetermined value, the resonant frequency of the piezoelectric actuator is set to a driving frequency, and the piezoelectric actuator is driven. In the driving device disclosed in JP-A-11-318091, when the driven member is disposed at a predetermined position, a contact pressure reducing leaf spring is used to reduce the contact pressure of the driven member on the driving shaft.

In the driving devices, the driving characteristics of the piezoelectric actuator vary depending on the duration of use and the frequency of use. For example, in some cases, the driven member, which is an object to be moved, is hardly moved at the beginning of moving according to the duration of use and the frequency of use. Therefore, in the driving devices disclosed in JP-A-9-191676 and JP-A-11-155292, it is difficult to perform a desired driving control operation at the beginning of the driven member moving, which may result in an operation error. In the driving device disclosed in JP-A-2006-115631, since the actuator is driven at the resonant frequency, a driving force at the beginning of moving is lowered, which may result in an operation error. In the driving device disclosed in JP-A-11-318091, it is necessary to provide an additional contact pressure reducing unit, which may result in a complicated structure.

SUMMARY OF THE INVENTION

The invention has been made in order to solve the above-mentioned technical problems, and an object of the invention is to provide a driving device and an optical apparatus capable of preventing the operation error of a piezoelectric actuator with a simple structure.

According to an aspect of the invention, a driving device includes: an actuator that includes a driving shaft attached to a piezoelectric element; and a driving signal control unit. The piezoelectric element is expanded and contracted in response to a driving signal, and the driving shaft is reciprocated by the expansion and contraction operation of the piezoelectric element to move a driven member that is frictionally engaged with the driving shaft. The driving signal control unit outputs to the piezoelectric element a second driving signal that increases a driving force applied to the driven member and reduces the movement speed of the driven member during a period from the start of the expansion and contraction operation of the piezoelectric element to a predetermined time, as compared to a first driving signal output when the driven member is moved after the period has elapsed.

In the driving device according to the above-mentioned aspect of the invention, the driving signal output during the period from the start of the operation of the actuator to a predetermined time increases the driving force applied to the driven member and reduces the movement speed of the driven member, as compared to the first driving signal output after a predetermined period has elapsed. According to this structure, it is possible to apply a driving force that is more than that when the driven member is moved to the driven member during a period immediately after the operation of the actuator starts. Therefore, it is possible to smoothly move the driven member immediately after the operation of the actuator starts. As a result, it is possible to control a driving signal to prevent an operation error with a simple structure, without providing an additional contact pressure reducing unit.

The driving signal control unit may use a pulse signal as the driving signal, and may make a pulse interval of the pulse signal output during the period different from that of the pulse signal output when the driven member is moved after the period. According to this structure, it is possible to control the pulse interval of the pulse signal to control the driving force applied to the driven member and the movement speed of the driven member.

The driving signal control unit may control the pulse interval of the pulse signal output during the period to be longer than that of the pulse signal output when the driven member is moved after the period has elapsed. According to this structure, it is possible to control the pulse interval of the pulse signal such that the application time of the voltage to the piezoelectric element during a predetermined period is longer than that when the driven member is moved after the period has elapsed. Therefore, a driving signal during a predetermined period can increase the driving force applied to the driven member and reduce the movement speed of the driven member, as compared to a driving signal output after the period has elapsed.

The driving signal control unit may control a driving frequency of the driving signal to be lower than a resonant frequency of the actuator. According to this structure, it is possible to prevent a reduction in driving force when the actuator is driven at a frequency equal to or higher than the resonant frequency.

The driving signal control unit may output continuous pulse signals to both ends of the piezoelectric element to expand and contract the piezoelectric element, and change the pulse interval of either or both the pulse signals, without changing the width of each of the pulse signals and a time lag defined by the rising edge of the pulse signal output to one end and the rising edge of the pulse signal output to the other end. According to this structure, it is possible to easily prevent an operation error.

According to another aspect of the invention, an optical apparatus includes the above-mentioned driving device. Since the optical apparatus includes the above-mentioned driving device, it is possible to effectively acquire the driving characteristics of an optical member.

According to the invention, it is possible to prevent the operation error of a piezoelectric actuator with a simple structure.

DESCRIPTION OF THE PREFERRED EMBODIMENTS

Hereinafter, exemplary embodiments of the invention will be described with reference to the accompanying drawings. In the drawings, the same or equivalent components are denoted by the same reference numerals, and a repeated description thereof will be omitted.

Figure 1:
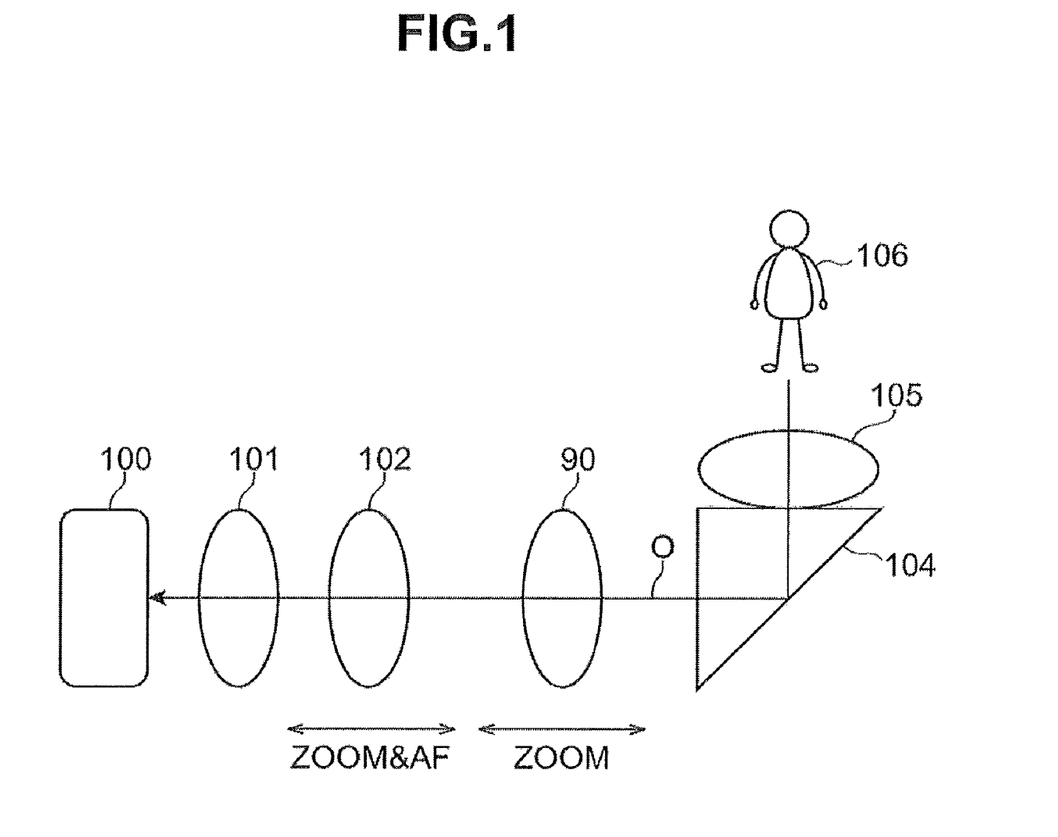
FIG. 1 is a diagram illustrating the outline of an imaging optical system of an imaging apparatus using a driving device according to an embodiment of the invention.

A driving device according to an embodiment of the invention is appropriately used for, for example, an imaging apparatus having a bending-type optical system. FIG. 1 is a diagram illustrating the outline of an imaging optical system of an imaging apparatus (optical apparatus) including the driving device according to this embodiment. As shown in FIG. 1, the imaging apparatus includes, for example, a fixed lens 105, a prism 104, moving lenses 90 and 102, a fixed lens 101, and an imaging device 82. The driving device according to this embodiment has a function of moving the moving lenses 90 and 102 along an optical axis O. Hereinafter, the driving device that moves the moving lens 90 will be described in detail for easy understanding of this embodiment.

Figure 2:
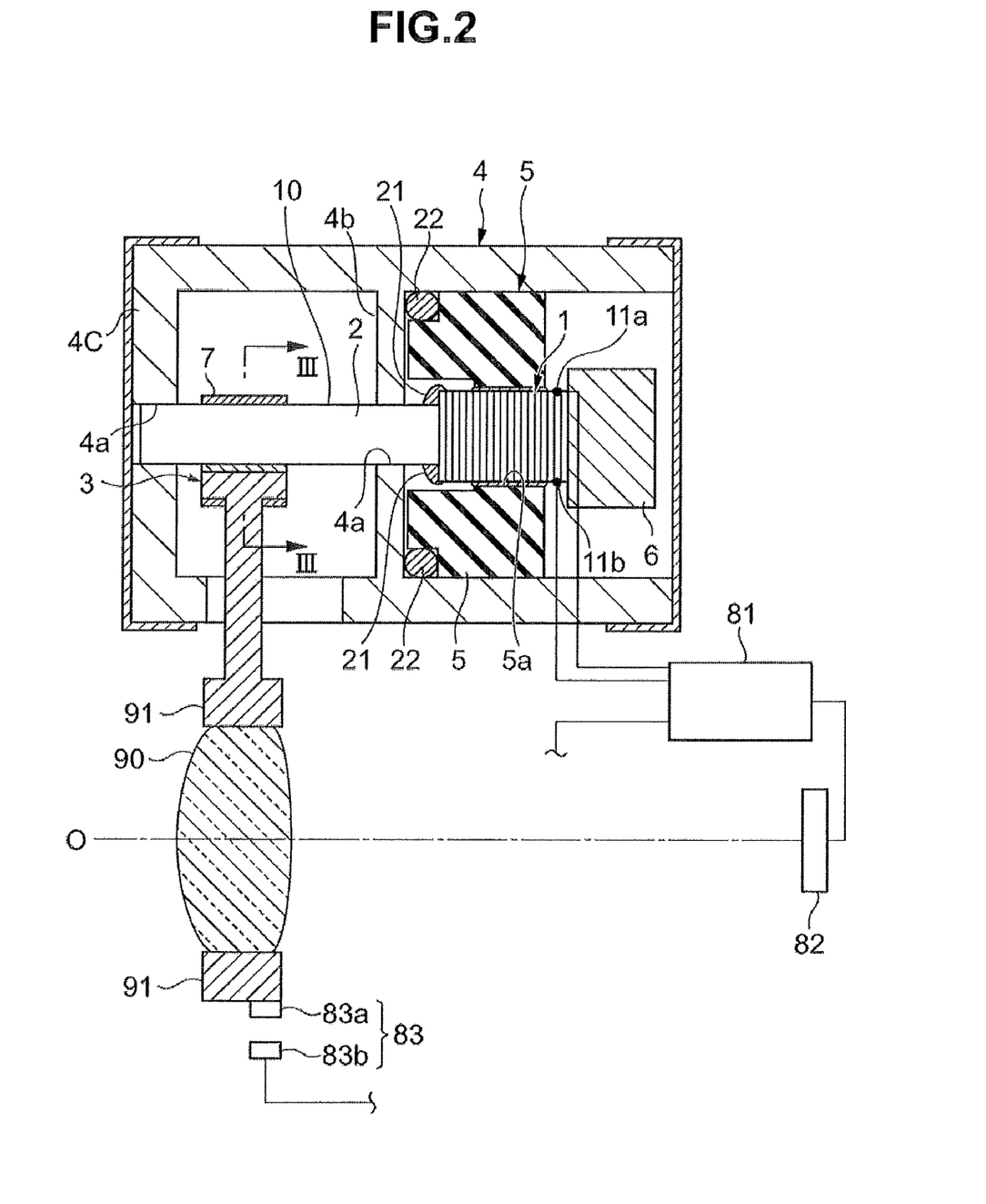
FIG. 2 is a cross-sectional view illustrating the driving device according to the embodiment of the invention.

FIG. 2 is a cross-sectional view illustrating the driving device according to this embodiment. As shown in FIG. 2, the driving device according to this embodiment includes an actuator 10 having a driving shaft 2 attached to a piezoelectric element 1. The driving device reciprocates the driving shaft 2 according to the expansion and contraction of the piezoelectric element 1 to move a driven member 3 that is frictionally engaged with the driving shaft 2 along the driving shaft 2. The driving device is appropriately used for an optical apparatus, such as an imaging apparatus, in order to move an optical member, such as a lens or an imaging device.

The piezoelectric element 1 is an electromechanical conversion element that can be expanded and contracted in response to an input driving signal, and can be expanded or contracted in a predetermined direction. The piezoelectric element 1 is connected to a control unit (driving signal control unit) 81, and is expanded and contracted in response to an electric signal input from the control unit 81. For example, the piezoelectric element 1 includes two input terminals 11a and 11b. A voltage applied to the input terminals 11a and 11b is repeatedly increased and decreased to repeatedly expand and contract the piezoelectric element 1. As the electromechanical conversion element, any element, such as a conductive polymer material or a shape memory alloy, other than the piezoelectric element 1 may be used as long as it can be expanded and contracted in response to an input driving signal.

The driving shaft 2 is attached to the piezoelectric element 1 such that the longitudinal direction thereof is aligned with a direction in which the piezoelectric element 1 is expanded and contracted. For example, one end of the driving shaft 2 is adhered to the piezoelectric element 1 by an adhesive 21. The driving shaft 2 is a long member, for example, a cylindrical member. The driving shaft 2 is supported by a partition portion 4a and a partition portion 4c extending inward from a fixed frame 4 such that it can be moved in the longitudinal direction. A partition portion 4b and the partition portion 4c are members for partitioning a movement region of the driven member 3, and also serve as members for supporting the driving shaft 2. The fixed frame 4 serves as a case that accommodates the piezoelectric element 1, the driving shaft 2, and the driven member 3 and is used for assembly.

The driving shaft 2 is preferably made of a light and high-rigidity material. In addition, the shape of the driving shaft 2 is not limited to a cylinder, but it may be a prism.

Through holes 4a through which the driving shaft 2 passes are formed in the partition portion 4b and the partition portion 4c. The partition portion 4b supports a portion of the driving shaft 2 to which the piezoelectric element 1 is attached, that is, the base of the driving shaft 2. The partition portion 4c supports the leading end of the driving shaft 2. Since the driving shaft 2 is attached to the piezoelectric element 1, it reciprocates along the longitudinal direction thereof according to the repeated expansion and contraction of the piezoelectric element 1.

In FIG. 2, the leading end and the base of the driving shaft 2 are supported by the partition portions 4b and 4c, respectively. However, only one of the leading end and the base of the driving shaft 2 may be supported. For example, the through hole 4a of the partition portion 4b is formed such that the diameter thereof is larger than the outside diameter of the driving shaft 2, and only the leading end of the driving shaft 2 is supported by the partition portion 4c. In addition, the through hole 4a of the partition portion 4c is formed such that the diameter thereof is larger than the outside diameter of the driving shaft 2, and only the base of the driving shaft 2 is supported by the partition portion 4b.

In FIG. 2, the partition portions 4b and 4c supporting the driving shaft 2 are formed integrally with the fixed frame 4.

However, the partition portions 4b and 4c may be formed separately from the fixed frame 4 and then attached to the fixed frame 4. In this case, it is also possible to obtain the same function and effects as those when the partition portions 4b and 4c are formed integrally with the fixed frame 4.

The driven member 3 is movably attached to the driving shaft 2. The driven member 3 is frictionally engaged with the driving shaft 2 and can be moved along the longitudinal direction of the driving shaft 2. For example, the driven member 3 comes into pressure contact with the driving shaft 2 by a leaf spring 7 and is engaged with the driving shaft 2 with a predetermined friction coefficient. The driven member 3 is pressed against the driving shaft 2 by a predetermined pressing force. Therefore, the driven member 3 is attached to the driving shaft such that a predetermined frictional force is generated when the driven member 3 is moved. When the driving shaft 2 is moved against the frictional force, the driven member 3 is maintained at that position by inertia, and the driving shaft 2 is moved relative to the driven member 3.

The piezoelectric element 1 is attached to the fixed frame 4 by the supporting member 5. The supporting member 5 supports the side of the piezoelectric element 1 in the expansion and contraction direction and is attached to the piezoelectric element 1. The supporting member 5 is provided between the piezoelectric element 1 and the fixed frame 4. In this case, it is preferable that the supporting member 5 support the piezoelectric element 1 in a direction orthogonal to the expansion and contraction direction. The supporting member 5 serves as an attachment member that supports the side of the piezoelectric element 1 and is attached thereto.

As such, the supporting member 5 supports the side of the actuator 10 in the direction in which the piezoelectric element 1 is expanded and contracted, and both ends of the actuator 10 are formed of free ends that can be moved in the direction in which the piezoelectric element 1 is expanded or contracted. Therefore, even when the actuator 10 is driven, vibration due to the expansion and contraction of the piezoelectric element 1 is hardly transmitted to the fixed frame 4. Therefore, it is possible to set the driving signal of the actuator 10 in connection with the resonant frequency of the actuator 10.

The supporting member 5 is made of an elastic material having an elasticity that is equal to or greater than a predetermined value. For example, the supporting member 5 is made of silicon resin. The supporting member 5 includes an insertion hole 5a into which the piezoelectric element 1 is inserted. The supporting member 5 is fixed to the fixed frame 4 with the piezoelectric element 1 being inserted into the insertion hole 5a. The supporting member 5 is fixed to the fixed frame 4 by an adhesive 22. The piezoelectric element 1 is fixed to the supporting member 5 by an adhesive. Since the supporting member 5 is made of an elastic material, it can support the piezoelectric element 1 so as to be movable in the expansion and contraction direction. In FIG. 2, two supporting members 5 are shown at both sides of the piezoelectric element 1. However, one annular supporting member 5 is shown as two supporting members 5 in a cross-sectional view.

The supporting member 5 may be pressed between the fixed frame 4 and the piezoelectric element 1, and the supporting member 5 may be fixed to the fixed frame 4 and the piezoelectric element 1 by the pressure of the supporting member 5. For example, the supporting member 5 is made of an elastic material with a size larger than the gap between the fixed frame 4 and the piezoelectric element 1 and is pressed therebetween. The supporting member 5 comes into close contact with the fixed frame 4 and the piezoelectric element 1. In this case, both sides of the piezoelectric element 1 in a direction orthogonal to the expansion and contraction direction thereof are pressed by the supporting member 5. In this way, the piezoelectric element 1 is supported.

In this embodiment, the supporting member 5 is made of silicon resin. However, the supporting member 5 may be a spring member. For example, a spring member may be provided between the fixed frame 4 and the piezoelectric element 1, and the spring member may support the piezoelectric element 1 relative to the fixed frame 4.

The moving lens (optical member) 90 is attached to the driven member 3 through a lens frame 91. The moving lens 90 forms an imaging optical system of a camera, and is moved by the driving device. The moving lens 90 is provided integrally with the driven member 3, and is moved together with the driven member 3. For example, a fixed lens (not shown) is provided on the optical axis O of the moving lens 90, and forms the imaging optical system of the camera. In addition, the imaging device 82 is provided on the optical axis O. The imaging device 82 is an imaging unit that converts an image formed by the imaging optical system into an electric signal, and is, for example, a CCD. The imaging device 82 is connected to the control unit 81, and outputs image signals to the control unit 81.

A weight member 6 is attached to the end of the piezoelectric element 1. The weight member 6 is for transmitting the stretching force of the piezoelectric element 1 to the driving shaft 2, and is attached to one end of the piezoelectric element 1 opposite to the other end to which the driving shaft 2 is attached.

The weight member 6 is a part of the actuator 10. The weight member 6 is heavier than the driving shaft 2.

The weight member 6 is made of a material having a Young's modulus less than those of the piezoelectric element 1 and the driving shaft 2. The Young's modulus of the weight member 6 is preferably equal to or less than 1 GPa, and more preferably, equal to or less than 300 MPa. It is preferable that the weight member 6 be fixed to the piezoelectric element 1 by an elastic adhesive.

The weight member 6 is provided such that it is not supported by and fixed to the fixed frame 4. That is, the weight member 6 is attached to the free end of the piezoelectric element 1. Therefore, the weight member 6 is not directly supported by or fixed to the fixed frame 4, and is not supported by or fixed to the fixed frame 4 with an adhesive or a resin material interposed therebetween such that the movement of the weight member 6 relative to the fixed frame 4 is not restricted.

The driving device is provided with a detector 83 that detects the position of the driven member 3. For example, an optical detector, such as a photo reflector or a photo interrupter, is used as the detector 83. Specifically, when the detector 83 includes a reflector 83a and a detecting unit 83b, the reflector 83a is attached to the lens frame 91 that is formed integrally with the driven member 3, and emits detection light from the detecting unit 83b to the reflector 83a. Then, the detecting unit 83b detects the light reflected from the reflector 83a, thereby detecting the positions of the driven member 3 and the moving lens 90.

The detector 83 is connected to the control unit 81. An output signal from the detector 83 is input to the control unit 81. The control unit 81 controls the overall operation of the driving device, and includes, for example, a CPU, a ROM, a RAM, an input signal circuit, and an output signal circuit. In addition, the control unit 81 includes a driving circuit for operating the piezoelectric element 1, and outputs a driving electric signal to the piezoelectric element 1.

Figure 3:
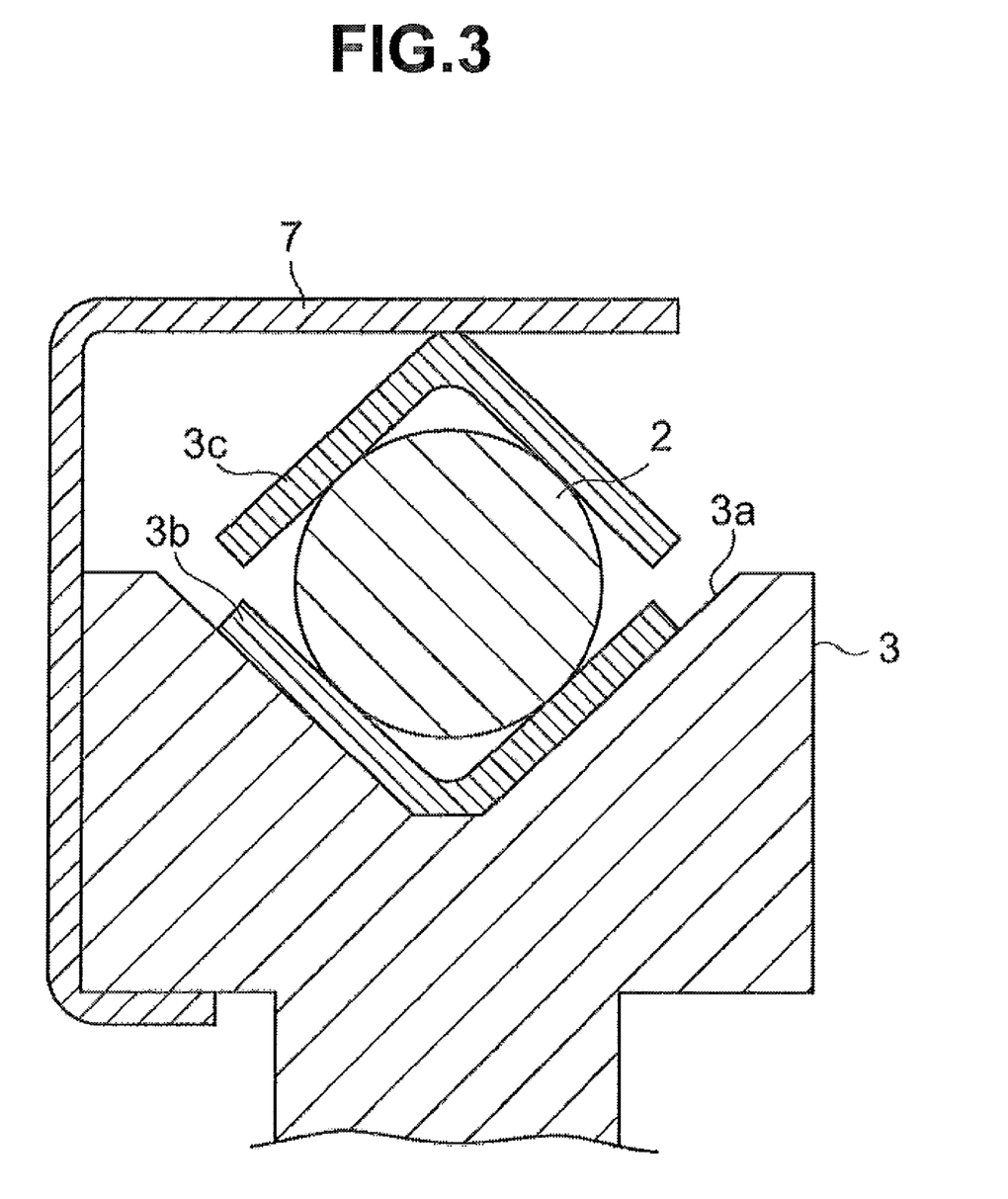
FIG. 3 is a cross-sectional view illustrating a driven member taken along the line III-III of FIG. 2.

FIG. 3 is a cross-sectional view illustrating a frictional engaging portion of the driven member 3 taken along the line III-III of FIG. 2. As shown in FIG. 3, the driven member 3 is pressed against the driving shaft 2 by the leaf spring 7 such that it is attached to the driving shaft 2. For example, a V-shaped groove 3a for positioning the driving shaft 2 is formed in the driven member 3. A sliding plate 3b having a V shape in a cross-sectional view is provided in the groove 3a, and the driving shaft 2 is pressed against the driven member 3 with the sliding plate 3b interposed therebetween.

In addition, a sliding plate 3c having a V shape in a cross-sectional view is provided between the leaf spring 7 and the driven member 3, and the leaf spring 7 presses the driven member 3 with the sliding plate 3c interposed therebetween. Therefore, the sliding plates 3b and 3c are arranged such that their concave portions face each other with the driving shaft 2 interposed therebetween. Since the driving shaft 2 is placed in the V-shaped groove 3a, it is possible to stably attach the driven member 3 to the driving shaft 2.

For example, a leaf spring having an L shape in a cross-sectional view is used as the leaf spring 7. One side of the leaf spring 7 is fixed to the driven member 3, and another side thereof is arranged opposite to the groove 3a such that the driving shaft 2 placed in the groove 3a is interposed between the driven member 3 and another side of the leaf spring.

As such, the leaf spring 7 presses the driven member 3 against the driving shaft 2 with a predetermined force to attach the driven member 3 to the driving shaft 2. In this way, the driven member 3 is frictionally engaged with the driving shaft 2. That is, the driven member 3 is pressed against the driving shaft 2 by a predetermined pressing force. When the driven member 3 is moved, a predetermined frictional force is generated.

Since the driving shaft 2 is interposed between the sliding plates 3b and 3c each having a V-shape in a cross-sectional view, the driven member 3 comes into linear contact with the driving shaft 2 at a plurality of points. Therefore, it is possible to frictionally engage the driven member 3 with the driving shaft 2 stably. In addition, the driven member 3 is engaged with the driving shaft 2 while coming into linear contact with the driving shaft at a plurality of points, which is actually the same as that when the driven member 3 comes into surface contact with the driving shaft 2. Therefore, it is possible to achieve a stable frictional engagement.

Figure 4:
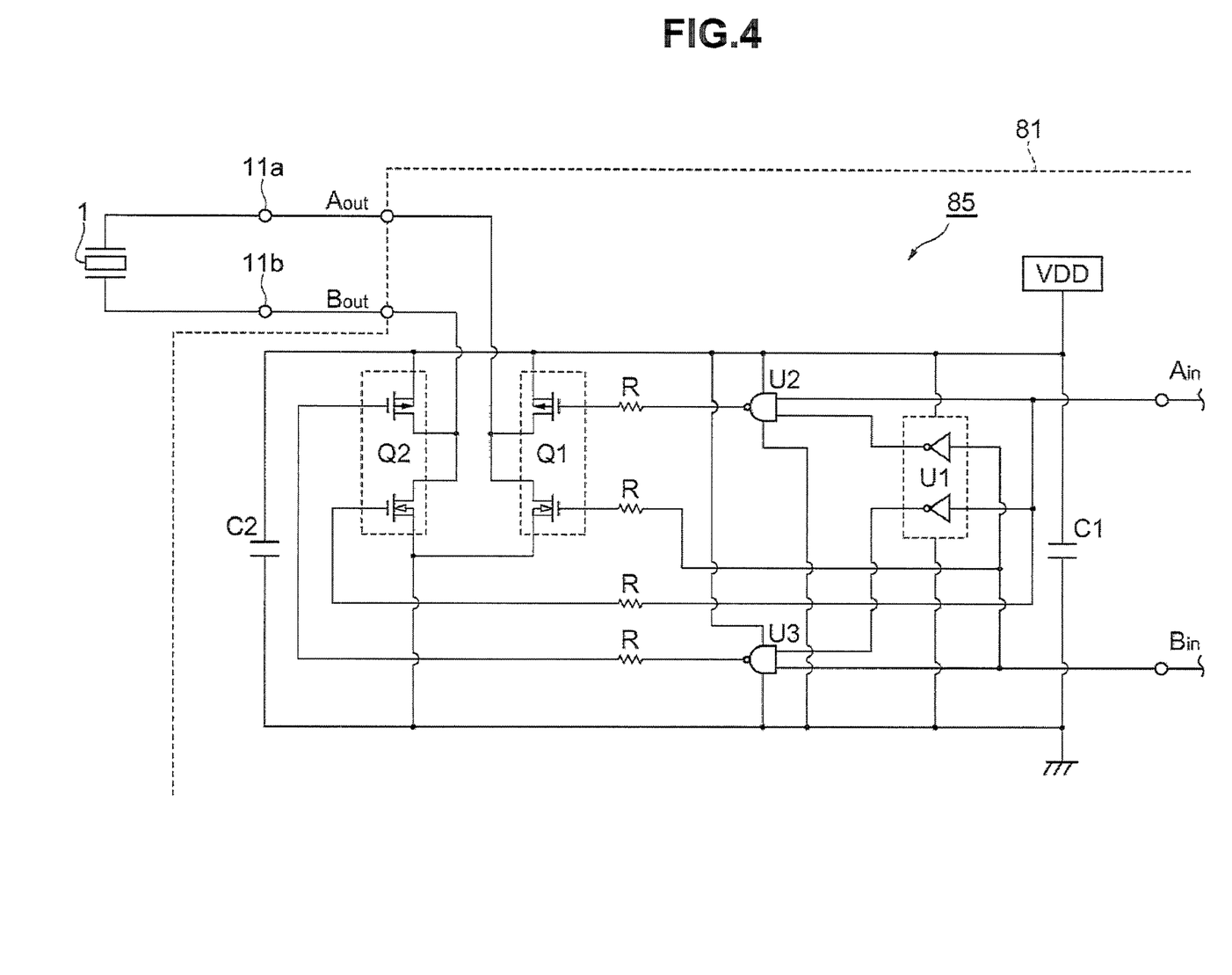
FIG. 4 is a diagram illustrating a driving circuit of the driving device shown in FIG. 2.

Next, the control unit 81 will be described in detail. The control unit 81 includes a driving circuit for operating the piezoelectric element 1. FIG. 4 is a circuit diagram illustrating a driving circuit 85 for operating the piezoelectric element 1. The driving circuit 85 serves as a drive circuit for the piezoelectric element 1, and outputs a driving electric signal to the piezoelectric element 1. The driving circuit 85 receives a control signal from a control signal generating unit (not shown) of the control unit 81, amplifies the voltage or current of the control signal, and outputs an electric signal for driving the piezoelectric element 1. The driving circuit 85 includes, for example, logic circuits U1 to U3 in an input stage and field effect transistors (FET) Q1 and Q2 in an output stage. The transistors Q1 and Q2 each can output a Hi output (high-potential output), a Lo output (low-potential output), and an OFF output (an off output or an open output) as output signals. The driving circuit shown in FIG. 4 is an example of a circuit for operating the piezoelectric element 1, and other circuits may be used to operate the piezoelectric element 1.

Figure 5A:
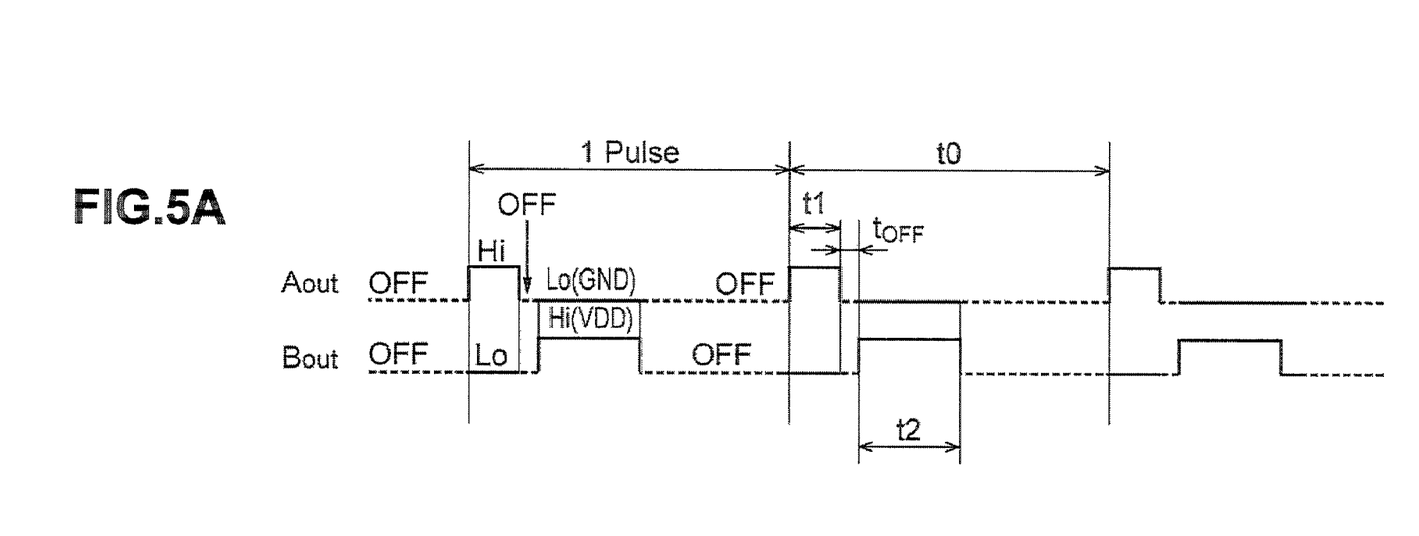
FIGS. 5A and 5B are diagrams illustrating the waveforms of driving signals input to a piezoelectric element of the driving device shown in FIG. 2.
Figure 5B:
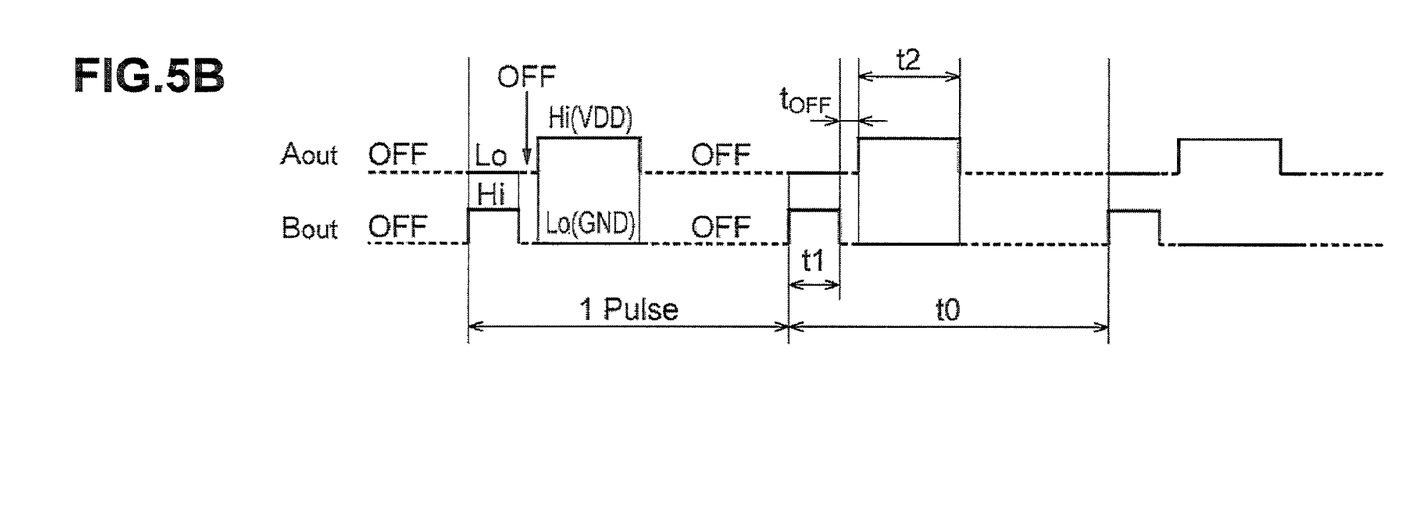

FIGS. 5A and 5B are diagrams illustrating examples of the driving signals output from the driving circuit 85. FIG. 5A shows a driving signal input to the piezoelectric element 1 when the driven member 3 is moved in a direction in which the driven member 3 approaches the piezoelectric element 1 (the right direction of FIG. 2), and FIG. 5B is a driving signal input to the piezoelectric element 1 when the driven member 3 is moved in a direction in which the driven member 3 is separated from the piezoelectric element 1 (the left direction of FIG. 2). The driving signals shown in FIGS. 5A and 5B are pulse signals when the actuator 10 is driven.

In the driving signals shown in FIGS. 5A and 5B, a pulse signal AOUT is input to one input terminal 11a of the piezoelectric element 1, and a pulse signal BOUT is input to the other input terminal 11b of the piezoelectric element 1. The two pulse signal waves AOUT and BOUT have the same frequency (a period t0). For example, the pulse signal waves AOUT and BOUT are set such that, after one signal is changed from a Hi level to a Lo level, the other signal is changed to a Hi level. In the signals, after a predetermined time lag tOFF has elapsed from the transition of one signal to a Lo level, the other signal is changed to a Hi level.

As such, since the signals have different phases, a potential difference between the signals varies stepwise in one direction and varies rapidly in the opposite direction, or the potential difference between the signals varies rapidly in one direction, and varies stepwise in the opposite direction. The potential difference between the pulse signals AOUT and BOUT is the input voltage of the piezoelectric element 1. The piezoelectric element 1 is expanded or contracted by the potential difference between the pulse signals. Each pulse of the signal is continuously input to the actuator 10 to continuously drive the piezoelectric element (driving state).

The driving signals shown in FIG. 5 are square waves. However, actually, triangle waves are input to the piezoelectric element 1 due to a capacitive component of the piezoelectric element 1. Therefore, if the duty ratio between the high level and the low level of the driving signal is not 50%, a square-wave driving signal is input to make the expansion velocity and the contraction velocity of the piezoelectric element 1 different from each other. Therefore, it is possible to move the driven member 3. The signals input to the actuator 10 are not limited to those shown in FIGS. 5A and 5B, but a saw-tooth-wave signal or a triangle-wave signal, not a pulse signal, may be input to the actuator.

The control unit 81 has a function of controlling the driving circuit 85 to change the pulse interval (a period t0) of the driving signals shown in FIGS. 5A and 5B according to the time elapsed from the start of driving. For example, the control unit 81 has a function of making the period from the start of the driving to a predetermined time different from the pulse interval of the driving signal output after the period has elapsed. Specifically, when the pulse interval of the driving signal output while the driven member 3 is being moved is, for example, a period t6, the control unit 81 drives the driving circuit at a pulse interval of a period t5 that is longer than the period t6 until a predetermined time has elapsed after the start of driving. The period from the start of driving to a predetermined time is defined by a predetermined number of pulses input after the start of driving. In addition, the control unit 81 has a function of changing only the pulse interval of the driving signal without changing the widths t1 and t2 of one pulse of the driving signal and the time lag tOFF. As such, since the control unit 81 has a function of changing the pulse intervals of the driving signals shown in FIGS. 5A and 5B, it can control the interval at which a voltage is applied to the piezoelectric element 1, which is defined by the rising edge of the pulse of the driving signal.

Figure 6:
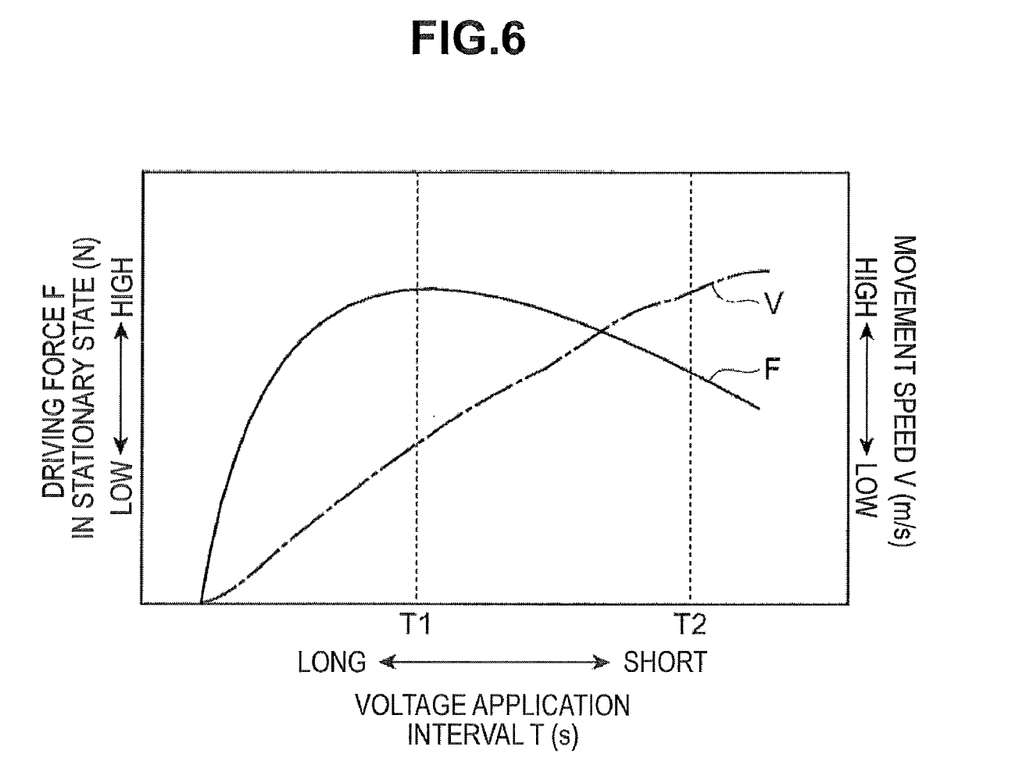
FIG. 6 is a diagram illustrating the driving characteristics of an actuator of the driving device shown in FIG. 2.
Figure 7:
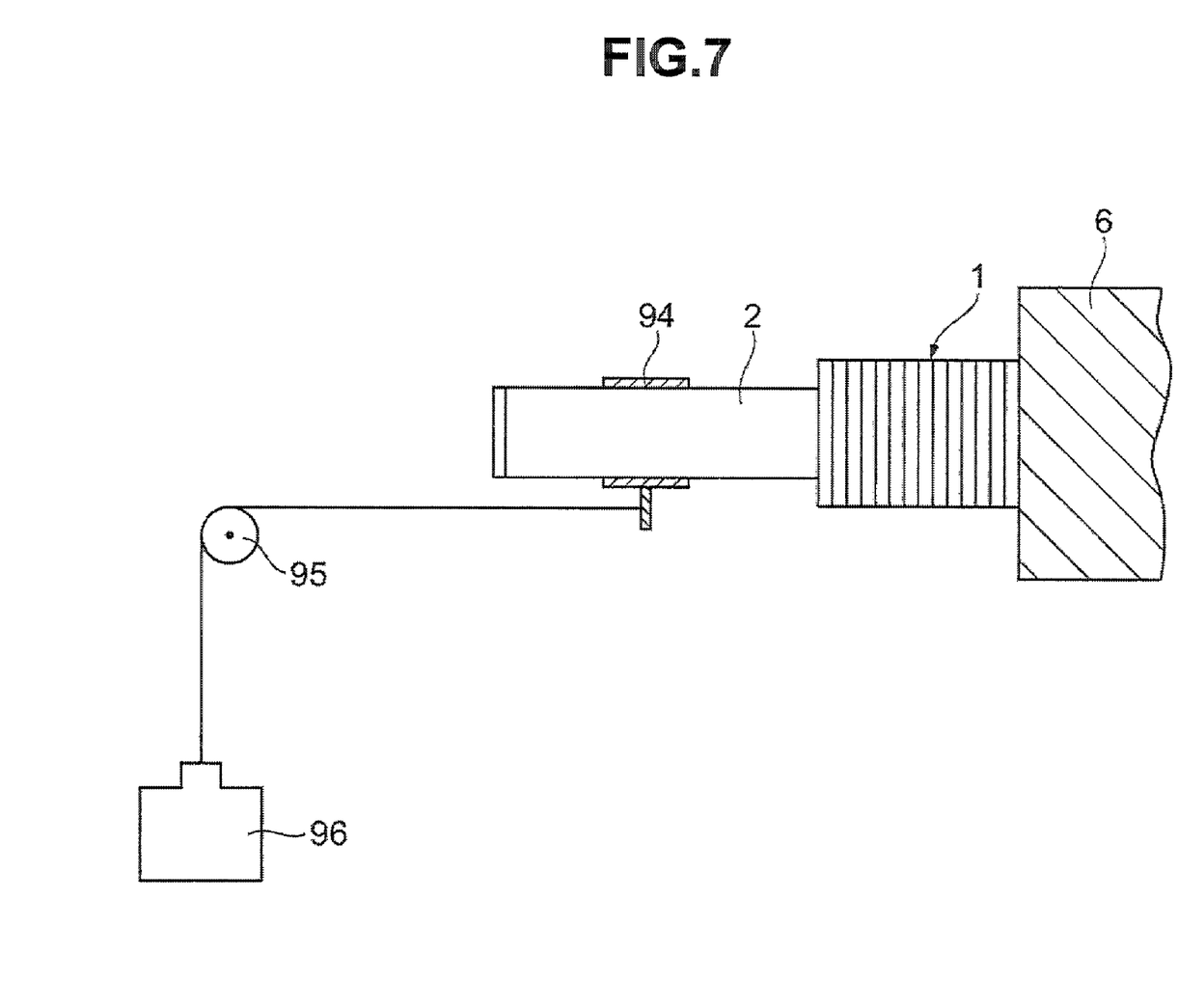
FIG. 7 is a diagram illustrating an example of the measurement of the driving force of the actuator of the driving device shown in FIG. 6 in a stationary state.

In addition, the control unit 81 has a function of controlling a voltage application interval on the basis of the driving characteristics of the piezoelectric element 1. Next, the driving characteristics of the piezoelectric element 1 will be described. For example, as shown in FIG. 6, the piezoelectric element 1 has driving characteristics that the movement speed V of the driven member 3 and the driving force F in a stationary state vary depending on an input voltage application interval T. The movement speed V means the movement speed of the driven member 3 after a predetermined time has elapsed from the start of driving. The driving force F in a stationary state means a reactive force acting in a direction opposite to the driving direction of the driving shaft 2 when the actuator 10 is driven with the driven member 3 in a stationary state. For example, as shown in FIG. 7, the driving force F in the stationary state can be measured by attaching a driven member 94 to the piezoelectric element 1, linking a rope to the attached driven member 94, suspending a weight 96 with the rope through a pulley 95, and driving the actuator 10.

As shown in FIG. 6, the driving force F in a stationary state is generated at a predetermined voltage application interval T when the voltage application interval is gradually reduced from a maximum value (the left side of FIG. 6), and tends to increase in the range of up to a voltage application interval T1. When the voltage application interval is shorter than T1, the driving force F in the stationary state tends to be proportionally reduced. The movement speed V tends to increase in proportion to the reduction in the voltage application interval.

The control unit 81 has a function of controlling the pulse interval of the driving signal used during the period from the start of driving to a predetermined time to be longer than the pulse interval of the driving signal used after the period has elapsed, such that the driving signal used during the period from the start of driving to a predetermined time increases the driving force F in the stationary state and reduces the movement speed V, as compared to the driving signal used after the period has elapsed. Since the control unit 81 has the above-mentioned function, it is possible to control a pulse interval, without controlling the level of the voltage of the driving signal, to increase the driving force F in the stationary state during the period from the start of driving to a predetermined time, that is, at the beginning of the driven member moving, thereby preventing an operation error, even when the driven member 3, which is an object to be moved, is hardly moved at the beginning of moving according to the duration of use or the frequency of use.

Figure 8:
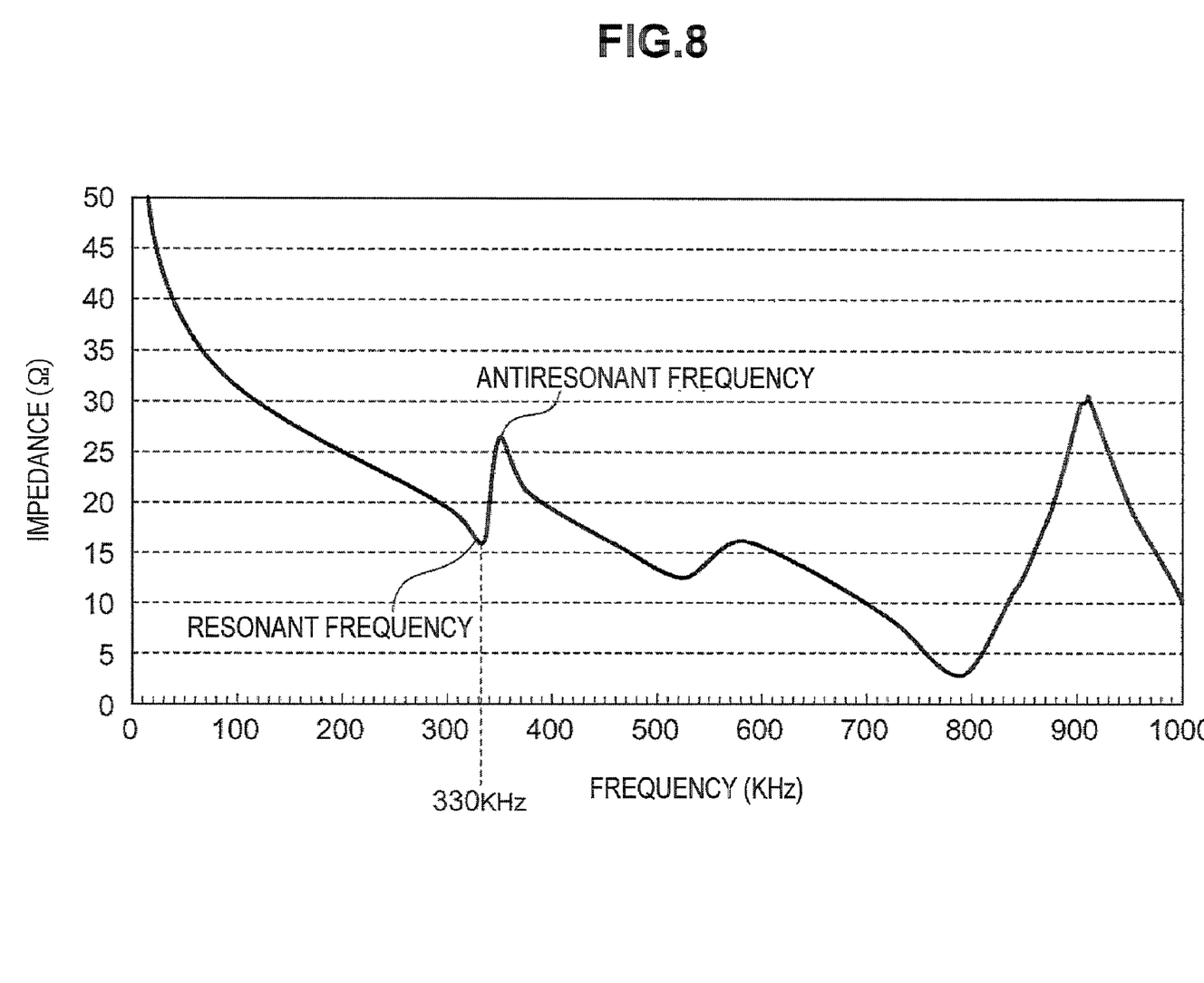
FIG. 8 is a diagram illustrating the relationship between the driving frequency and the impedance of the actuator of the driving device shown in FIG. 2.

Furthermore, the control unit 81 has a function of controlling the pulse interval of the driving signal such that the frequency f of the driving signal is lower than the mechanical or electrical resonant frequency fr of the actuator 10. For example, as shown in FIG. 8, if the resonant frequency fr of the actuator 10 is 330 kHz, the frequency f of the driving signal is lower than 330 kHz. In this way, it is possible to prevent a reduction in the driving force F in the stationary state when the actuator is driven at a frequency equal to or higher than the resonant frequency fr.

Next, the operation of the driving device according to this embodiment will be described.

In FIG. 2, when a driving signal is input to the piezoelectric element 1, the piezoelectric element 1 is repeatedly expanded and contracted in response to the input driving signal. The driving shaft 2 is reciprocated with the expansion and contraction of the piezoelectric element. In this case, when the expansion velocity and the contraction velocity of the piezoelectric element 1 are different from each other, the movement speed of the driving shaft 2 in one direction is different from that in the opposite direction. In this way, it is possible to move the driven member 3 and the moving lens 90 in a desired direction. In addition, it is possible to control the movement speed V by controlling the number of reciprocations of the driving shaft 2 per unit time.

Figure 9:
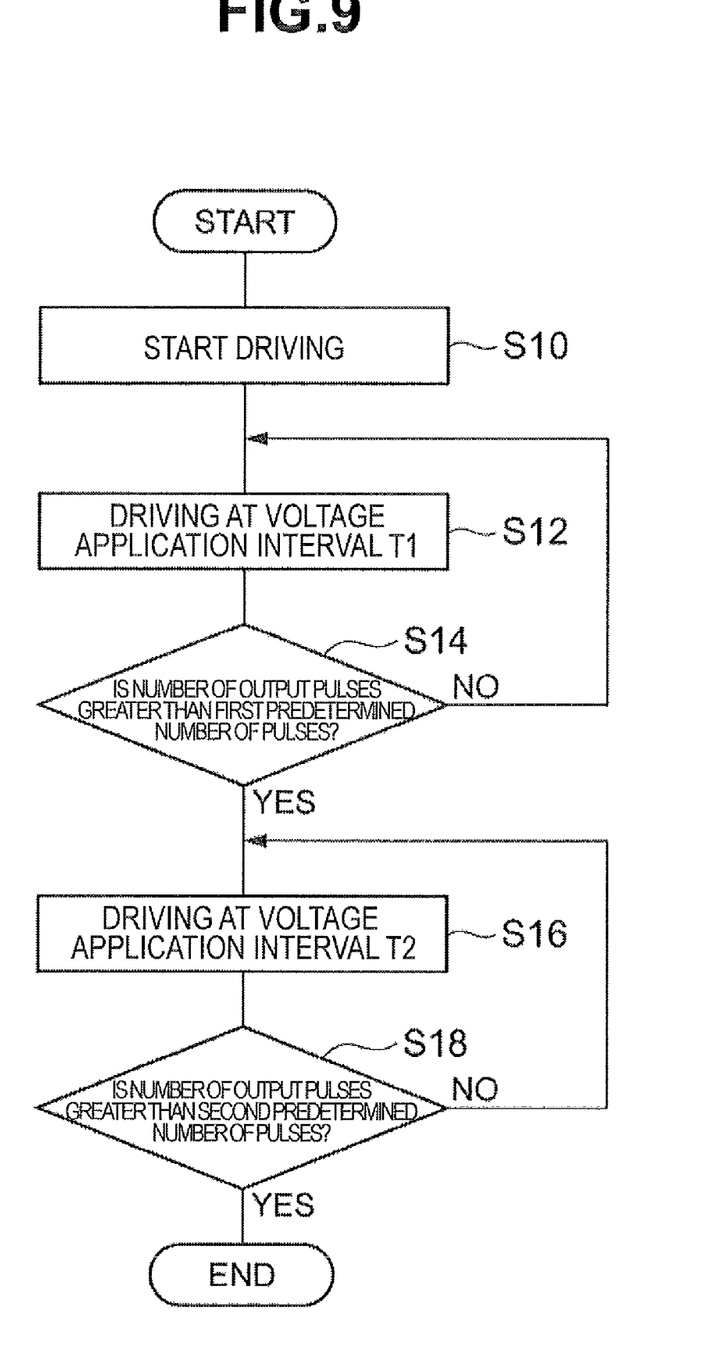
FIG. 9 is a flowchart illustrating the operation of the driving device shown in FIG. 2.

Next, the operation of the driving device according to this embodiment will be described in detail. FIG. 9 is a flowchart illustrating the operation of the driving device according to this embodiment. For example, the control process shown in FIG. 9 starts when the control unit 81 drives the driven member 3.

Figure 10A:
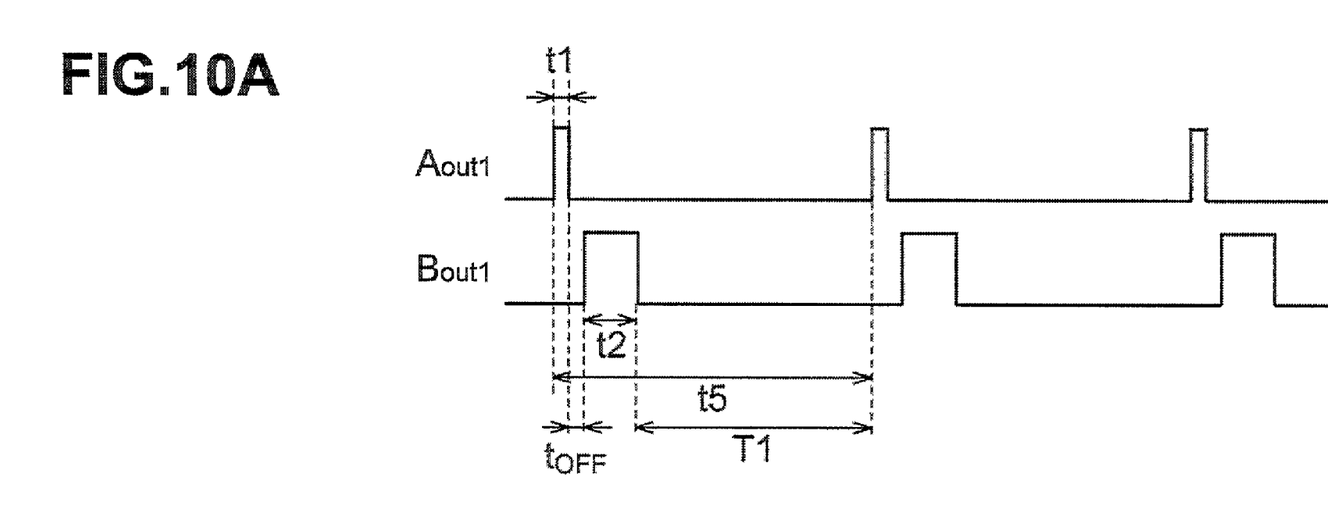
FIGS. 10A and 10B are diagrams illustrating the waveforms of driving signals input to the piezoelectric element of the driving device shown in FIG. 2 when movement starts.
Figure 10B:
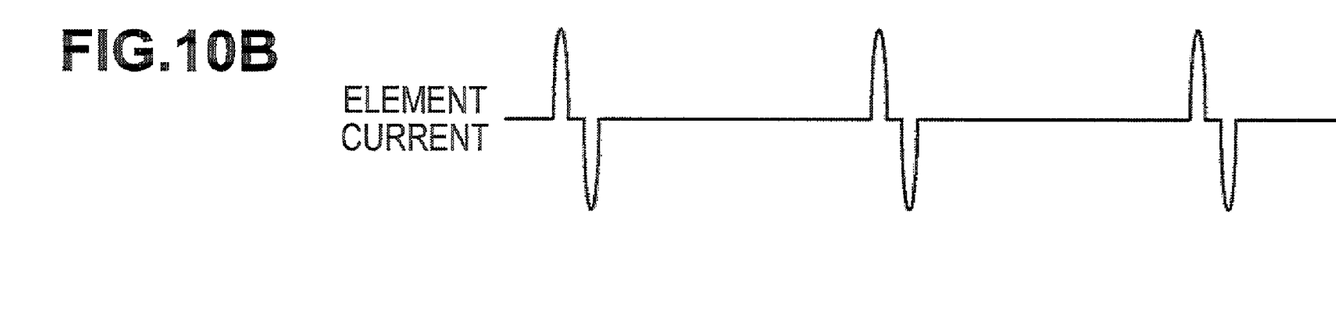

When the control process shown in FIG. 9 starts, the control unit 81 operates the driving circuit 85 (S10). Then, the control unit 81 controls the driving circuit 85 to input, for example, driving signals shown in FIG. 10A to the piezoelectric element 1 (S12). FIG. 10A shows the driving signals, in which the pulse width of a pulse signal AOUT1 is t1, the pulse width of a pulse signal BOUT1 is t2, and the time lag between the pulse signals AOUT1 and BOUT1 is tOFF. FIG. 10B shows an element current defined by the rising edges of the waveforms of the driving signals shown in FIG. 10A. As shown in FIG. 10A, a voltage application interval is T1. For example, as shown in FIG. 6, the driving force F in the stationary state at the voltage application interval T1 is more than that at a voltage application interval T2, and the movement speed V at the voltage application interval T1 is less than that at the voltage application interval T2.

The control unit 81 counts the number of output pulses, and determines whether the count value is greater than, for example, a first predetermined number of pulses (S14). If the count value is not greater than the first predetermined number of pulses, the control unit 81 performs Step S12 again. As such, Step S12 is repeatedly performed until a predetermined number of pulses are output. In this way, the driving signals shown in FIG. 10A are input during the period from the start of driving to a predetermined time.

Figure 11A:
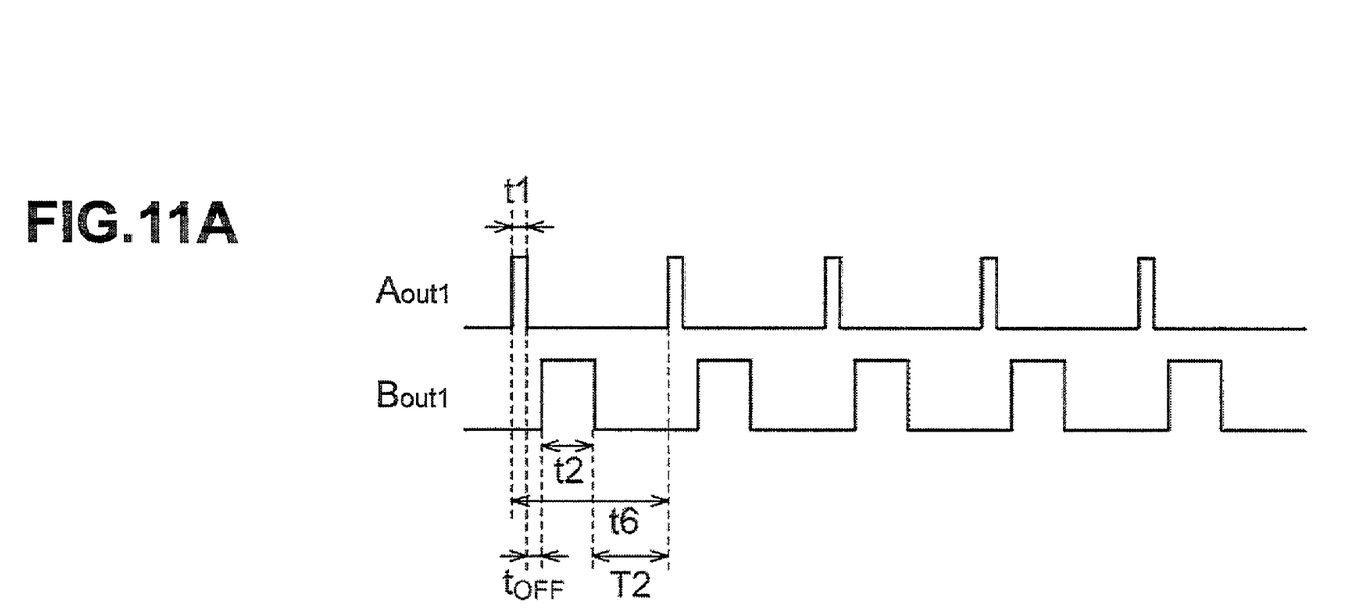
FIGS. 11A and 11B are diagrams illustrating the waveforms of driving signals input to the piezoelectric element of the driving device shown in FIG. 2 during movement.
Figure 11B:
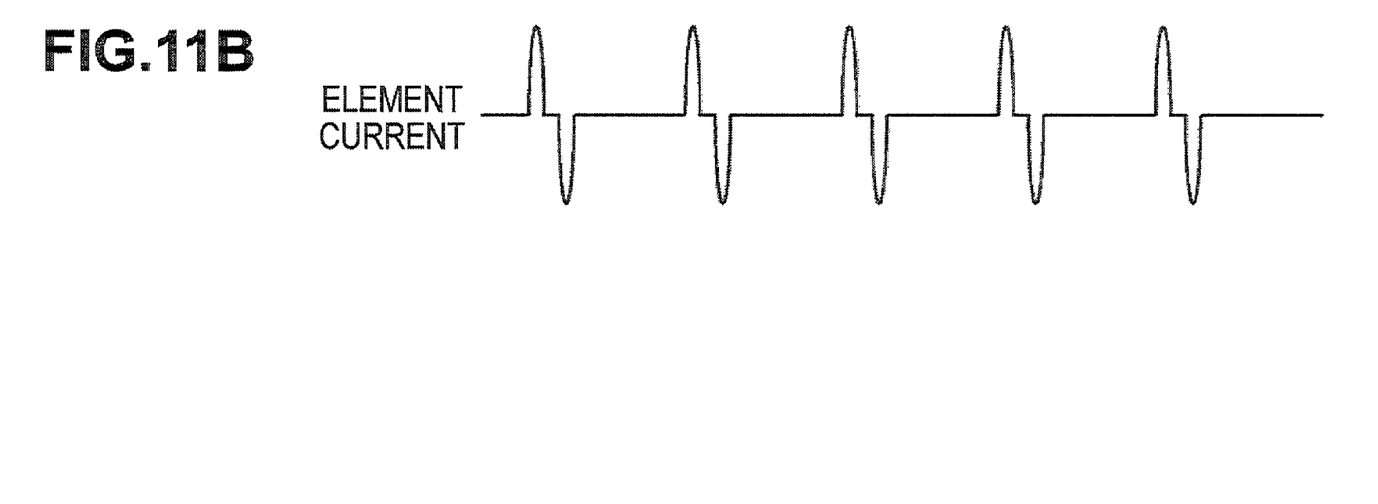

If it is determined in Step S14 that the count value is greater than the first predetermined number of pulses, for example, driving signals shown in FIG. 11A are input to the piezoelectric element 1 (S16). FIG. 11A shows the driving signals, in which the pulse width of a pulse signal AOUT1 is t1, the pulse width of a pulse signal BOUT1 is t2, and the time lag between the pulse signals AOUT1 and BOUT1 is tOFF, similar to FIG. 10A. FIG. 11B shows an element current defined by the rising edges of the waveforms of the driving signals shown in FIG. 11A. As shown in FIG. 11A, a voltage application interval is T2. For example, as shown in FIG. 6, the driving force F in the stationary state at the voltage application interval T2 is less than that at the voltage application interval T1, and the movement speed V at the voltage application interval T2 is more than that at the voltage application interval T1.

The control unit 81 counts the number of output pulses and determines whether the count value is greater than, for example, a predetermined second number of pulses (S18). If the count value is not greater than the second predetermined number of pulses, the control unit 81 performs Step S16 again. As such, Step S16 is repeatedly performed until a predetermined number of pulses are output. In this way, the driving signals shown in FIG. 11A are input during the period from the start of driving to a predetermined time.

If it is determined in Step S18 that the count value is greater than the predetermined second number of pulses, the control process shown in FIG. 9 ends. As such, the driving device according to this embodiment can increase the driving force F in the stationary state when driving starts, and prevent an operation error due to deterioration over time.

As described above, according to the driving device and the optical apparatus according to this embodiment, the driving signal output during the period from the start of the operation of the actuator 10 to a predetermined time increases the driving force F in a stationary state that is applied to the driven member 3 and reduces the movement speed V of the driven member 3, as compared to the driving signal output after a predetermined period has elapsed. Therefore, it is possible to apply a driving force F in a stationary state that is more than that when the driven member 3 is moved to the driven member 3 during the period immediately after the operation of the actuator starts. Thus, it is possible to smoothly move the driven member 3 immediately after the operation of the actuator starts. As a result, it is possible to control a driving signal to prevent an operation error with a simple structure, without providing an additional contact pressure reducing unit.

Further, according to the driving device and the optical apparatus according to this embodiment, the control unit 81 can control the pulse interval of a pulse signal to control the driving force F in a stationary state applied to the driven member 3 and the movement speed V of the driven member 3.

Furthermore, according to the driving device and the optical apparatus according to this embodiment, the control unit can control the pulse interval of a pulse signal to set the application time T1 of the voltage to the piezoelectric element 1 during the period from the start of driving to a predetermined time to be longer than the application time T2 during movement after the start of driving. Therefore, the driving signal output during the period from the start of driving to a predetermined time can increase the driving force F in a stationary state that is applied to the driven member 3 and reduce the movement speed V of the driven member 3, as compared to the driving signal output after the period from the start of driving to a predetermined time has elapsed.

Further, according to the driving device and the optical apparatus according to this embodiment, the control unit 81 can prevent a reduction in the driving force F in a stationary state when the actuator is driven at a frequency equal to or higher than the resonant frequency fr.

Furthermore, according to the driving device and the optical apparatus according to this embodiment, it is possible to prevent an operation error immediately after the operation of the actuator starts only by changing a pulse interval from t5 to t6, without changing the pulse widths t1 and t2 of the pulse signals AOUT1 and BOUT1 and the time lag tOFF between the pulse signals AOUT1 and BOUT1. Therefore, it is possible to easily prevent an operation error.

The driving device and the optical device according to the above-described embodiment of the invention are just an example. The invention is not limited to the driving device and the optical apparatus according to the above-described embodiment, but various modifications and changes of the invention can be made without departing from the scope and spirit of the invention.

For example, in the above-described embodiment, a zoom lens is used as the moving lens 90. However, an auto focus lens may be used as the moving lens. In addition, the invention may be applied to, for example, a driving device that drives a probe, a stage, or an optical member, such as an imaging device, other than the moving lens 90. Further, the invention may be applied to an actuator that moves a lens in a direction orthogonal to the optical axis, such as an image stabilizer.

In the above-described embodiment, an imaging apparatus is used as the optical apparatus. However, the invention may be applied to control a piezoelectric element used for, for example, the driving of an ink jet printer head, the ejection of ink, or a lighting device.

In the above-described embodiment, the piezoelectric element 1 is attached to the fixed frame 4 with the supporting member 5 interposed therebetween, and the end of the piezoelectric element 1 is a free end. However, the end of the piezoelectric element 1 may be directly attached to the fixed frame 4.

In the above-described embodiment, the pulse widths t1 and t2 of the pulse signals AOUT1 and BOUT1 and the time lag tOFF between the pulse signals AOUT1 and BOUT1 are not changed, but the pulse interval is changed. However, all of the pulse widths t1 and t2, the time lag tOFF, and the pulse interval may be changed.

In the above-described embodiment, a piezoelectric element is used as the actuator of the imaging apparatus and the optical apparatus. However, other driving parts, such as a polymer actuator and a shape memory alloy, may be used as the actuator.

What is claimed is:

1. A driving device comprising:
an actuator that includes a driving shaft attached to a piezoelectric element; and
a driving signal control unit,
wherein the piezoelectric element is expanded and contracted in response to a driving signal,
the driving shaft is reciprocated by the expansion and contraction operation of the piezoelectric element to move a driven member that is frictionally engaged with the driving shaft, and
the driving signal control unit outputs to the piezoelectric element a second driving signal that increases a driving force applied to the driven member and reduces the movement speed of the driven member during a period from the start of the expansion and contraction operation of the piezoelectric element to a predetermined time, as compared to a first driving signal output when the driven member is moved after the period has elapsed.

2. The driving device according to claim 1,
wherein the driving signal control unit uses a pulse signal as the driving signal, and makes a pulse interval of the pulse signal output during the period different from that of the pulse signal output when the driven member is moved after the period.

3. The driving device according to claim 2,
wherein the driving signal control unit controls the pulse interval of the pulse signal output during the period to be longer than that of the pulse signal output when the driven member is moved after the period has elapsed.

4. The driving device according to claim 2,
wherein the driving signal control unit outputs continuous pulse signals to both ends of the piezoelectric element to expand and contract the piezoelectric element, and changes the pulse interval of either or both the pulse signals, without changing the width of each of the pulse signals and a time lag defined by the rising edge of the pulse signal output to one end and the rising edge of the pulse signal output to the other end.

5. The driving device according to claim 1,
wherein the driving signal control unit controls a driving frequency of the driving signal to be lower than a resonant frequency of the actuator.

6. An optical apparatus comprising:
the driving device according to claim 1; and
an optical member that is driven by the driving device.

* * * * *